(12) United States Patent
Rakshit et al.

(10) Patent No.: US 12,483,558 B2
(45) Date of Patent: Nov. 25, 2025

(54) DETERMINING DIGITAL TRUST OF A CLIENT DEVICE AND USER FOR ACCESS PERMISSION

(71) Applicant: DigiCert, Inc., Lehi, UT (US)

(72) Inventors: Samir Kumar Rakshit, Bengaluru (IN); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 132 days.

(21) Appl. No.: 18/504,306

(22) Filed: Nov. 8, 2023

(65) Prior Publication Data

US 2025/0106214 A1 Mar. 27, 2025

(30) Foreign Application Priority Data

Sep. 26, 2023 (IN) .............................. 202341064438

(51) Int. Cl.
*H04L 9/40* (2022.01)
(52) U.S. Cl.
CPC .................................. *H04L 63/101* (2013.01)
(58) Field of Classification Search
CPC .......................... H04L 63/101; H04L 63/0823
See application file for complete search history.

(56) References Cited

U.S. PATENT DOCUMENTS

| | | | |
|---|---|---|---|
| 8,745,616 B1 | 6/2014 | Deacon | |
| 8,826,395 B2 | 9/2014 | Bretschneider et al. | |
| 8,924,296 B2 * | 12/2014 | Bailey, Jr. | G06Q 20/322 705/44 |
| 9,077,546 B1 | 7/2015 | Rakshit | |
| 9,479,338 B2 | 10/2016 | Sabin | |
| 10,341,321 B2 | 7/2019 | Kumar et al. | |
| 11,025,655 B1 * | 6/2021 | Eren | H04W 12/12 |
| 11,134,058 B1 * | 9/2021 | Sole | G06F 21/554 |
| 11,457,040 B1 * | 9/2022 | Sole | H04L 63/101 |
| 11,552,953 B1 * | 1/2023 | Avadhanam | H04L 63/102 |
| 11,625,476 B2 | 4/2023 | Choules et al. | |
| 11,722,320 B2 | 8/2023 | Rowley et al. | |
| 2003/0212806 A1 * | 11/2003 | Mowers | G06F 21/31 726/4 |
| 2004/0133640 A1 * | 7/2004 | Yeager | H04L 67/104 709/204 |
| 2006/0015722 A1 * | 1/2006 | Rowan | H04L 63/0823 713/166 |
| 2006/0212931 A1 * | 9/2006 | Shull | H04L 63/104 726/10 |
| 2012/0137364 A1 | 5/2012 | Blaisdell | |
| 2014/0237091 A1 | 8/2014 | Sabin et al. | |

(Continued)

*Primary Examiner* — Azizul Choudhury
(74) *Attorney, Agent, or Firm* — Baratta Law PLLC; Lawrence A. Baratta, Jr.

(57) ABSTRACT

Systems and methods for determining digital trust of a device and a user for access permission include monitoring a client device and its access to a network and to resources connected to the network; analyzing behavior-based factors and posture-based factors to determine a digital trust rating at a given time for the client device, wherein the posture-based factors include a rating of certificates associated with the client device and a rating of a Domain Name System (DNS) server associated with the client device; and providing the digital trust rating at the given time for the client device for use in access permission of the client device to the network and/or to the resources.

20 Claims, 3 Drawing Sheets

(56) References Cited

U.S. PATENT DOCUMENTS

| | | | |
|---|---|---|---|
| 2015/0213131 A1* | 7/2015 | Styler | H04L 61/4511 |
| | | | 707/767 |
| 2020/0322386 A1* | 10/2020 | Mani | H04L 9/3234 |
| 2021/0211308 A1 | 7/2021 | Veladanda et al. | |
| 2023/0065060 A1 | 3/2023 | Kumar et al. | |
| 2024/0056466 A1* | 2/2024 | Hathaway | H04L 51/212 |

* cited by examiner

DETERMINING DIGITAL TRUST OF A CLIENT DEVICE AND USER FOR ACCESS PERMISSION

FIELD OF THE DISCLOSURE

The present disclosure relates generally to computing and networking. More particularly, the present disclosure relates to systems and methods for determining digital trust of a client device and user for access permission.

BACKGROUND OF THE DISCLOSURE

Access to a network, file share, website, application, or any digital resource is a complex task. The conventional approach relied on user accounts and passwords, but this was prone to misuse, fraud, data loss, etc. Other approaches build on the user account and password, such as with so-called two-factor authentication where there are two different factors, e.g., something the user has (e.g., security token, authentication application, etc.), something the user knows (e.g., password, PIN, etc.), and/or something the user is (e.g., biometrics, etc.). These approaches are helpful in answering the question, is the user who they say they are? That is, these can answer the question of identity at a point in time. There is a need to go further and there has been an evolution to managing digital trust which is deeper and more meaningful than mere access credentials. For example, a valid user may be on an untrustworthy device, leading to malicious activity such as due to an infection on the untrustworthy device.

BRIEF SUMMARY OF THE DISCLOSURE

The present disclosure relates to systems and methods for determining digital trust of a client device and user for access permission, i.e., to a network, application, web site, file share, cloud resources, or the like. In various embodiments, the present disclosure includes a service for rating a user and a device in terms of a digital trust score based on a combination of factors including digital certificates on the device, user identity, trusted Domain Name System (DNS), as well as behavior of the user and the device. Such a digital trust score can be used for access permission or protection, i.e., to allow or block the user, the device, or both the user and the device. Specifically, identity is a Boolean value—yes or no, whereas digital trust can be more and provide more meaningful information which can advantageously be used to manage access permissions.

In various embodiments, the present disclosure includes a method having steps, a processing device configured to implement the steps, a cloud service configured to implement the steps, and a non-transitory computer-readable medium storing instructions for programming one or more processors to execute the steps. The steps include monitoring a client device and its access to a network and to resources connected to the network; analyzing behavior-based factors and posture-based factors to determine a digital trust rating at a given time for the client device, wherein the posture-based factors include a rating of certificates associated with the client device and a rating of a Domain Name System (DNS) server associated with the client device; and providing the digital trust rating at the given time for the client device for use in access permission of the client device to the network and/or to the resources. The steps can further include evaluating the posture-based factors at the given time and continually evaluating the behavior-based factors over time; and updating the digital trust rating based on the posture-based factors at the given time and the behavior-based factors as they change over time. The analyzing behavior-based factors can include evaluating behavior of the client device and/or a user associated with the client device against legitimate and illegitimate actions on the network and with the resources. The digital trust rating can be for one of (1) the client device and (2) a user on the client device such that the user has a different digital trust rating when using a different client device. The steps can further include, responsive to the digital trust rating being below a threshold, revoking access to the network and/or the resources by revoking one or more of the certificates associated with the client device.

The analyzing posture-based factors can include scoring the digital trust rating based on whether the client device has previously been seen based on an Internet Protocol (IP) address, a device fingerprint, and a network access technology for the client device. The analyzing posture-based factors can include scoring the digital trust rating based on a rating assigned to a network access technology for the client device. The analyzing posture-based factors can include scoring the digital trust rating based on how a user of the client device is authenticated. The steps can further include receiving details of the certificates from a software agent operating on the client device. The rating of certificates associated with the client device can be based on whether the certificates are expired, revoked, or current, a security level of the certificates, and a life left on the certificates.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
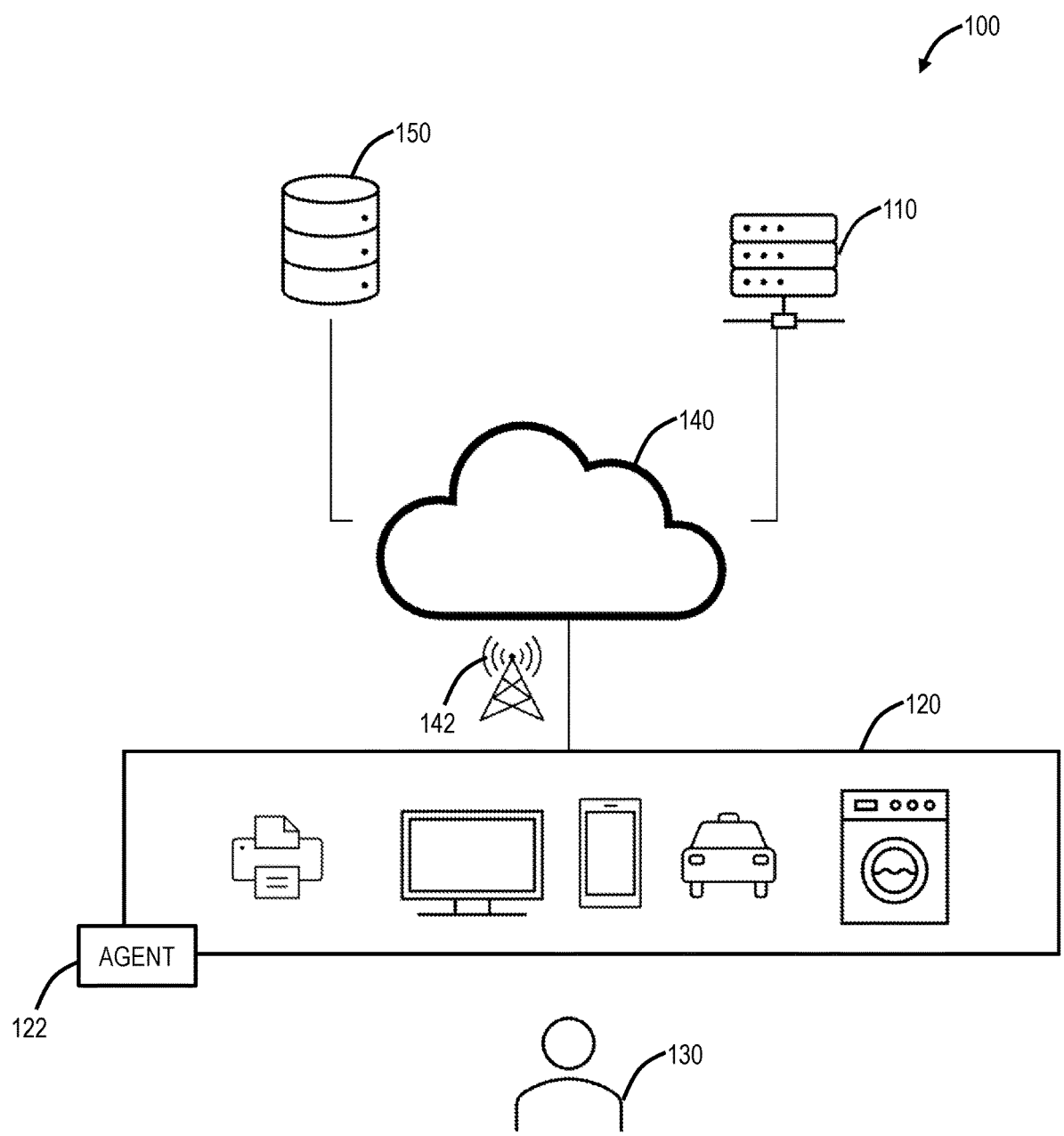
FIG. 1 is a network diagram of a dynamic digital trust rating system.

Again, the present disclosure relates to systems and methods for determining digital trust of a device and a user for access permission, i.e., to a network, application, web site, file share, cloud resources, or the like. In various embodiments, the present disclosure includes a service for rating a user and a device in terms of a digital trust score based on a combination of factors including digital certificates on the device, user identity, trusted Domain Name System (DNS), as well as behavior of the user and the device. Such a digital trust score can be used for access permission or protection, i.e., to allow or block the user, the device, or both the user and the device. Specifically, identity is a Boolean value-yes or no, whereas digital trust can be more and provide more meaningful information which can advantageously be used to manage access permissions.

Identity Management

Identity management, also referred to as Identity access management, is a combination of policies and technologies for ensuring the right users have the appropriate access to computing resources. Again, the identity management can be based on one or more factors, i.e., something the user has (e.g., security token, authentication application, etc.), something the user knows (e.g., password, PIN, etc.), and/or something the user is (e.g., biometrics, etc.). The identity management can establish trust for individual and business identities in the digital world for scenarios such as online account creation, logins, digital or electronic signatures, payments, Public Key Infrastructure (PKI) certificates, etc. For example, Certificate Authority (CA) can validate customer and business identities in order to issue digital certificates. Identity trust and verification also allows for compliance with regulations, fraud prevention and helps provide a smooth experience for online users. The output of the identity management verifies a user's identity.

Digital Trust

Digital trust enables individuals and businesses to engage online with confidence that their footprint in a digital world is secure. Digital trust has now become the backbone for security in the connected world: for securing users, software, servers, devices, digital content, documents, digital rights, identity and more. Digital trust is about more than a product or service. It is established upon four key building blocks: 1) Industry and technology standards that define what constitutes trust; 2) Compliance and operations that govern delivery of trust; 3) Unified trust management platforms for certificate lifecycle management of public and private trust; 4) Extension of trust through ecosystems such as connected devices, software supply chains and digital content provenance.

Again, identity is a Boolean value—yes or no. Digital trust, on the other hand, can be represented by a plurality of values given some level of confidence in the user and the device. In addition to being a range of values, e.g., 0 to 100, or some discrete levels, or the like, the digital trust representation can change over time based on activity and other factors, as well as change based on specific device for the user, e.g., a user's work computer may have one higher level of digital trust, whereas a public computer being used by the user may have a lower level of digital trust.

As described herein, digital trust is represented by some range of values that can extend from zero trust to high trust along with a one or more intermediate values, i.e., it is not a simple Boolean value, but a range of values. Further, the term digital trust is used herein to refer to the range of values, i.e., the digital trust is defined by a value, indicator, or rating that is one of the range of values. Even further, the digital trust can evolve over time, i.e., the value, indicator, or rating can change based on the user's activity, based on factors associated with the user's device, etc. Of note, the digital trust can be a value that accounts for both the user and the device being used by the user.

Digital Trust Rating System

FIG. 1 is a network diagram of a dynamic digital trust rating system 100. The digital trust rating system 100 includes a cloud rating service 110, client devices 120 which may include a software agent 122 operating thereon, a user 130 possibly associated with one or more of the client devices 120, a network 140 which can include a network access technology 142, and resources 150. The cloud rating service 110 is configured to monitor the client devices 120 as well as monitor activity of the client devices 120 and the users 130 interacting with the resources 150. The cloud rating service 110 can directly monitor the client devices 120 as well as communicate with a corresponding software agent 122 operating thereon. For example, the cloud rating service 110 can monitor activity of the client devices 120 on the network 140, monitor how the client devices connect to the network 140 via the network access technology 142, and monitor posture of the client devices 120.

This monitoring by the cloud rating service 110 can be direct where the cloud rating service 110 receives data from distributed probes, firewalls, the resources 150 themselves, proxies, Secure Web Gateways (SWGs), and the like. The monitoring by the cloud rating service 110 can also be indirect where the cloud rating service 110 receives log data, analytics, and the like, such as from the software agent 122, from the resources 150, from the network access technology 142, and the like. Those skilled in the art will recognize there are various approaches to monitoring, all of which are contemplated herewith. That is, the cloud rating service 110 has access to data that can be used to determine a digital trust rating, and any approach to obtaining the data is contemplated herein.

Figure 3:
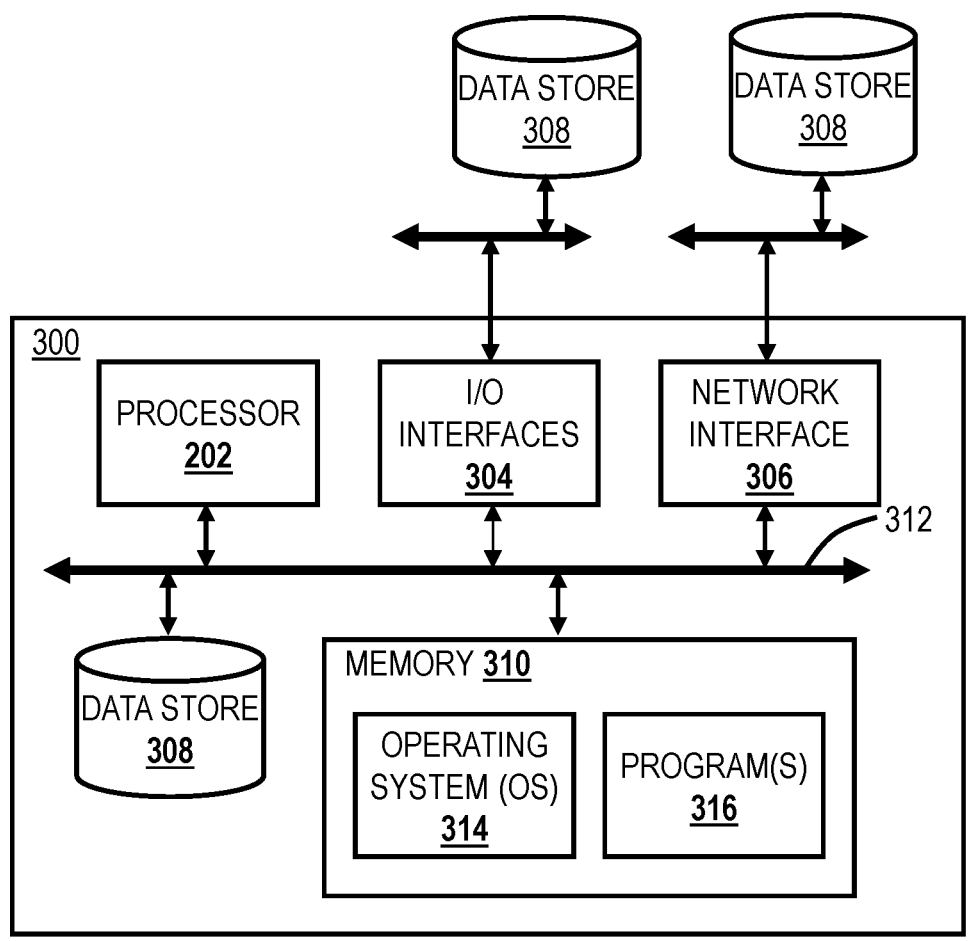
FIG. 3 is a block diagram of a processing device, which may implement any of the devices described herein.

The client devices 120 can be processing devices, such as illustrated in FIG. 3, which are capable of communicating on the network 140, accessing the network 140 via the network access technology 142, and interacting with the resources 150. The client devices 120 can be computers (desktop, laptops, servers, etc.), mobile devices (phones, tablets, etc.), Internet of Things (IoT) devices (i.e., any connected device), embedded devices, and the like. That is, the client devices 120 can be any digital device configured to communicate on the network 140. In some embodiments, the client devices 120 can have corresponding users 130 operating thereon, such as computers, mobile devices, etc. In other embodiments, the client devices 120 may not have users 130, such as with IoT devices, embedded devices, etc. The digital trust rating can be for the client device 120, such as for IoT devices, embedded devices, etc., as well as for the client device 120 with a specific user 130, such as for computers, mobile devices, etc. In this manner, a user 130 can have multiple digital trust ratings if they use multiple client devices 120, e.g., a mobile phone and a laptop. Additionally, a client device 120 can have multiple digital trust ratings if they are used by multiple users 130, such as, e.g., a public computer, etc.

Also, in some embodiments, the client device 120 can execute the software agent 122. The software agent 122 is configured to perform functions on the client device 120 and communicate with the cloud rating service 110. For example, the functions can include gathering information about the client device 120, monitoring activity by the client device 120, and allowing or blocking communications over the network 140, such as based on the digital trust rating. For example, the software agent 122 can be installed on a computer, mobile device, IoT device, embedded device, etc. In other embodiments, the client device 120 may be unable to load external software, such as the software agent 122. For example, some IoT devices, embedded devices, etc. do not support external applications. Here, the cloud rating service 110 can monitor the client device 120 directly, via the network access technology 142, via proxies, firewalls, probes, etc., and the functions such as allowing or blocking communications over the network 140 can be implemented via devices external to the client devices 140.

The network 140 can be one or more networks, including the Internet, Wide Area Networks (WAN), Local Area Networks (LAN), service provider networks, and combinations thereof. The cloud rating service 110 can be on the Internet, focused on a single network, such as an enterprise network, and the like. The network access technology 142 can be how the client device 120 is accessing the network, such as a cellular network, a cable network, a public Wi-Fi network, and the like.

The objective of the digital trust rating system 100 is to assign a digital trust rating to a specific client device 120 and possibly to a specific user 130 associated with the specific client device 120. The present disclosure includes a holistic approach which looks at various factors for determining the current digital trust rating, and this approach is described with reference to FIG. 2.

Cloud Rating Service

In an embodiment, the cloud rating service 110 is a cloud service accessed by third-party services for obtaining the digital trust rating. In another embodiment, the cloud rating service 110 can provide some information to third-party services for them to determine their own digital trust rating. In either embodiment, the cloud rating service 110 can be implemented by a Certificate Authority (CA). A CA is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate. For certificate authorities, existing individual validation processes involve the use of third-party verification services to validate basic individual information such as first name, last name, professional title, etc.

Digital Trust Rating Factors

Again, the digital trust rating is a score having some objective value determined based on various factors. The factors are evaluated at a given time and are used to determine the digital trust rating at the given time. Those skilled in the art will recognize there are various approaches to evaluate the score and the following description provides some example factors and their impact on the score. In various embodiments, the present disclosure contemplates incorporating scoring factors from a CA in terms of certificates on the client device 120, the network access technology 142, a trust rating of a DNS for the client device 120, and the like. As is described herein, a CA has a unique view of the trust of these aspects, in real-time, allowing them to be incorporated in any dynamic trust score.

The factors can be categorized as either behavior-based factors or posture-based factors. The behavior-based factors look at the activity of the client device 120 and/or the user 130. That is, how is the client faring inside the network 140, accessing the resources 150, etc. Here, good behavior can raise the digital trust rating and bad behavior can lower the digital trust rating. Examples of bad behavior can include accessing resources 150, machines, etc. that the client device 120 and/or user 130 does not have permission, transmitting malicious packets, trying to connect to unauthorized external sites, and the like. Examples of good behavior can include accessing legitimate sites, connecting to authorized external sites, and the like. The idea here is to use the digital trust rating to model whether the client device 120 and/or user 130 is acting trustfully or not. Similar to a credit rating, the digital trust rating would be correlated to the trust of that device 120 and/or user 130, just as a credit rating is correlated to an individual's credit worthiness. We do not want to simply authenticate the user's 130 identity and give them access to the network 140 and the resources 150. Rather, we authenticate the user's 130 identity and give them access to the network 140 and the resources 150 and monitor their behavior, with the possibility or reducing permission, blocking access, etc. if the behavior warrants it.

The posture-based factors look at parameters associated with the client device 120 and/or user 130. These parameters are not behavior, but some aspect that can provide some indicator of trust. Examples include Internet Protocol (IP) address, device fingerprint, the network access technology 142, DNS server, user authentication approach, certificates on the client device 120, whether the software agent 122 is operating, and the like. We are using these parameters to prejudge the client device 120 and/or the user 130.

The IP address, the device fingerprint, and the network access technology 142 can first be used to determine whether or not the client device 120 has been seen before by the cloud rating service 110. The IP address may or may not be unique since these can be assigned and have different values over time, such as based on Dynamic Host Configuration Protocol (DHCP). If a client device 120 shows up on the network 140 with a same IP address at different times, this may increase the digital trust rating. Conversely, if the client device 120 shows up with different IP addresses, this may decrease the digital trust rating.

The device fingerprint can be some combination of data that uniquely identifies the client device 120. For example, this can include some combination of Media Access Control (MAC) address, serial number, device name, operating system of the device, and the like. A client device 120 having a stable device fingerprint can increase the digital trust rating, whereas if the parameters change, this can decrease the digital trust rating. Regarding IoT devices (and even smart phones), there are approaches where these devices are being release with specific imperfections that can be used as their identity, e.g., Physical unclonable functions (PUF). Additionally, once an IoT device gets a certificate, that certificate will act as its identity.

The network access technology 142 determines how the client device 120 is accessing the network 140. There can be various types of connections—home networks (e.g., cable modem, Digital Subscriber Line (DSL), Passive Optical Network (PON)), wireless networks (e.g., cellular providers, public Wi-Fi, etc.), in-office connectivity via a LAN, a Virtual LAN (VLAN) connection, and the like. In an embodiment, with the CA providing the cloud rating service 110, it is possible to rate the network access technology 142 over time and based on some observation of trust of the network access technology 142. For example, some public Wi-Fi networks can be seen as hosting malicious users and therefore given lower digital trust ratings. Conversely, a VLAN connection to the network 140 may be given higher digital trust ratings.

The DNS server of the client device 120 can be rated—is this a trusted DNS or not? DNS uses designated authoritative nameservers to map domain names to numerical IP addresses. DNS servers, or nameservers, are the machines that respond to DNS queries. In an embodiment, with the CA providing the cloud rating service 110, it is possible to rate the DNS server of the client device 120. This rating can be based on some objective measure of the trustworthiness of the DNS server, as rated by the CA. The CA can rate the DNS based on automatic domain classification (external, internal, critical infrastructure, sensitive data handling etc.), suspicious, malicious activity/patterns, confirmed incidents, repeated similar behavior, and the like.

The user authentication approach can rate how the user 130 is authenticated. For example, a simple user ID and password may have a lower digital trust rating whereas two-factor authentication may be higher and biometric authentication may be even higher. Another factor can include the presence or absence of the software agent 122 on the client device 120, i.e., the presence of the software agent 122 can increase the digital trust rating whereas the absence of the software agent 122 can decrease the digital trust rating.

In an embodiment, there can be an evaluation of certificates on the client device 120 and corresponding digital trust ratings based thereon. X509 certificates are defined by ITU X509, Information technology-Open Systems Interconnection—The Directory: Public-key and attribute certificate frameworks, October 2019, the contents of which are incorporated by reference in their entirety. An X509 certificate binds an identity to a public key using a digital signature. A certificate contains an identity (a hostname, or an organization, or an individual) and a public key (e.g., RSA, DSA, ECDSA, ed25519, etc.), and is signed by a certificate authority. X509 also defines certificate revocation lists, which are a means to distribute information about certificates that have been deemed invalid by a signing authority, as well as a certification path validation algorithm, which allows for certificates to be signed by intermediate CA certificates, which are, in turn, signed by other certificates, eventually reaching a trust anchor.

A digital certificate authenticates the online credentials and identity of a person or organization and allows web users and recipients to know that the data they're inputting is going to a trusted source. They are akin to security badges for websites and users and help keep the internet safe. A Transport Layer Security (TLS)/Secure Sockets Layer (SSL) certificate serves two purposes (1) encrypts and secures data transmitted between websites, browsers and web servers, and (2) helps to identify and authenticate website owners. Secure/Multipurpose Internet Mail Extensions, or S/MIME, is an internet standard to digitally sign and encrypt email messages. It ensures the integrity of email messages remains intact while being received. By using digital signatures, S/MIME provides for authentication, message integrity, and non-repudiation of origin. There can also be various other types of certificates.

A client device 120 can include various digital certificates stored thereon. For example, in Windows-based devices there is a local machine certificate store. In Apple-based devices, the certificates are stored in a Keychain access application. Also, IoT devices can be preloaded with various certificates for IoT management, communication, etc.

The present disclosure contemplates analyzing and rating the certificates associated with the client device 120 for purposes of assigning a digital trust rating. In this embodiment, the CA can provide or support the cloud rating service 110 and evaluate the status of certificates. The CA will know if certificates are valid or not, the security rating of certificates, the age of the certificate, etc. For example, the CA can provide or assign a score to a given client device 120 based on the present certificates. Scoring can be (1) negative for expired or revoked certificates, positive for current certificates,
(2) higher for more secure certificates, e.g., RSA2048 certificates have a higher score than RSA1024 certificates,
(3) higher for certificates having longer life,
And the like.

A CA understands certificates, and in an embodiment, the CA can provide the cloud rating service 110 as a service for scoring a device 120 based on the certificates present thereon. Also, it is possible to rate the certificates based on the CA that issued the certificate, e.g., lower trust for new CAs or ones with poor reputations, trust rating based on a location of the CA (e.g., a CA from the United States may have higher trust than a smaller country).

Scoring

Those skilled in the art will recognize there can be various scores assigned to the various factors along with various weightings to combine the scores for the factors to achieve an overall score on a scale. The present disclosure contemplates any such approach and is focused on the use of the behavior-based factors and the posture-based factors. Also, those skilled in the art will recognize the scores, weightings, and the combination can be adjusted over time based on historical data, analysis, and the like.

For example, assume a device 120, endpoint, software agent 122, etc. has an Access Control List rule (e.g., view, edit, delete, access specific set of resources etc.) for a specific resource(s). Now, over time as the device 120, performs legitimate actions and follows all rules, it can receive positive points (the digital trust rating gets increased). Now, say, the device 120 performs some illegitimate actions from not on an allowed list, it loses points (the digital trust rating gets decreased).

As the digital trust rating decreases so the permissions are deducted from the given ACL rule set. On a certain threshold, the access of the device 120 can be totally revoked or suspended automatically. Note: Repeated illegitimate actions in short duration by any agent/set of agents would be a good indication of some serious security incident (say, rogue/infected client/machine, infected/hacked client, malicious activity, etc.).

Use of the Digital Trust Rating

The present disclosure contemplate actual use of the digital trust rating for some purpose in the network 140 and/or with the resources 150. This can include disabling or enabling access permission, i.e., access to the network 140, access to the resources 150, etc., as well as how much protection is provided to the client device 120. This methodology can be used for internal and external client (which might be some internal servers, independent machines like, employee computer or external client connecting to the network).

The behavior-based and posture-based factors can be used to obtain the digital trust rating which can decide access permission and/or protection assigned to the device 120 and/or user 130. The dynamic digital trust rating can be used to reduce or increase a level of access to the network 140 and/or the resources 150. Also, if there are reductions in the digital trust rating and/or if the device 120 is being attacked, it is possible to upgrade the protection of the device 120 while downgrading the access permission.

In an embodiment, the access permission can be enabled or disabled using the certificates. For example, if there is a need to revoke access, it is possible the cloud rating service 110 can revoke certain certificates.

Process

Figure 2:
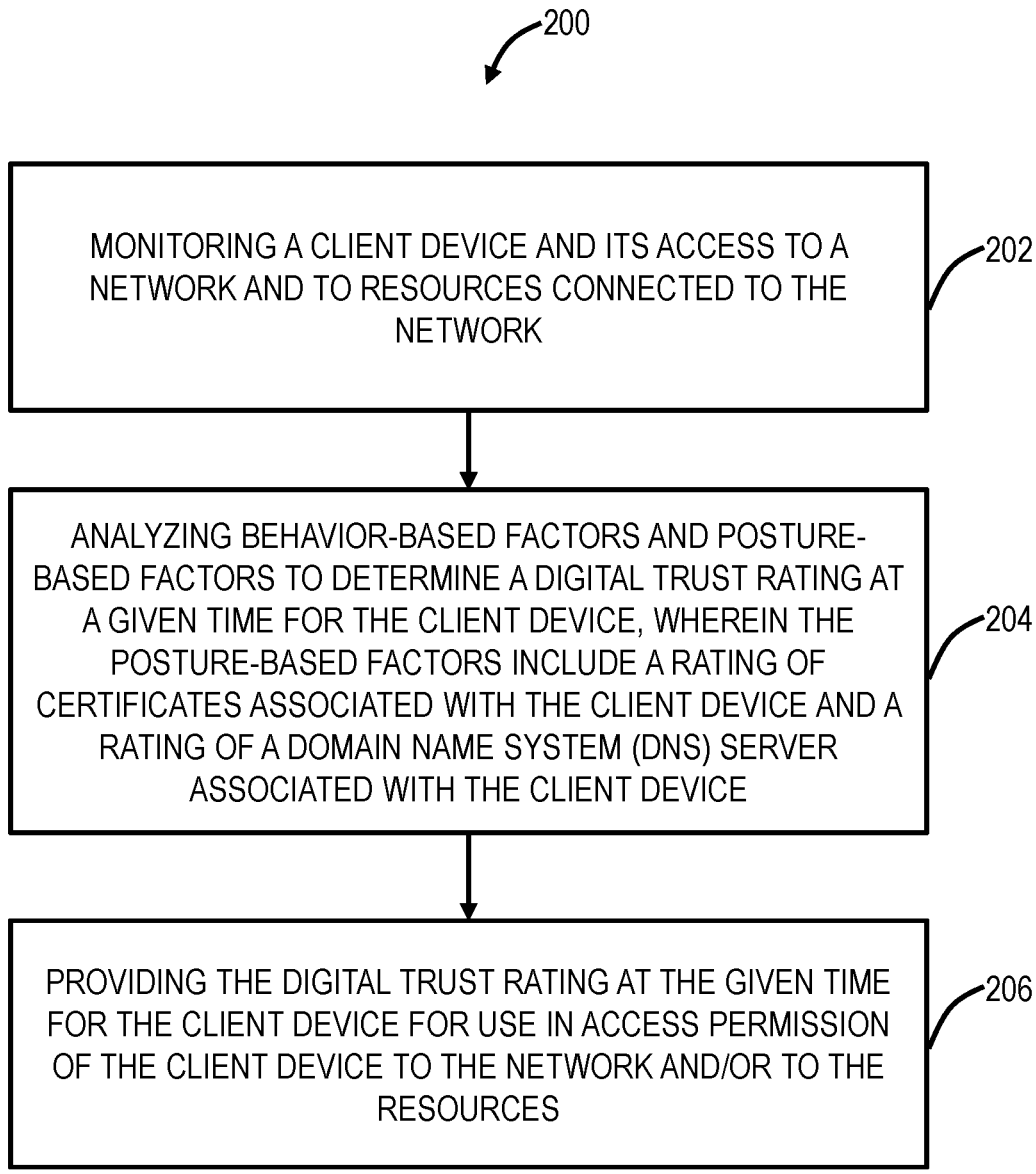
FIG. 2 is a flowchart of a process for determining digital trust of a client device and user for access permission.

FIG. 2 is a flowchart of a process 200 for determining digital trust of a client device and user for access permission. The process 200 contemplates implementation as a method having steps, via a cloud service configured to implement the steps, and via a non-transitory computer-readable medium storing instructions for programming one or more processors to execute the steps.

The process 200 includes monitoring a client device and its access to a network and to resources connected to the network (step 202); analyzing behavior-based factors and posture-based factors to determine a digital trust rating at a given time for the client device, wherein the posture-based factors include a rating of certificates associated with the client device and a rating of a Domain Name System (DNS) server associated with the client device (step 204); and providing the digital trust rating at the given time for the client device for use in access permission of the client device to the network and/or to the resources (step 206).

The process 200 can include evaluating the posture-based factors at the given time and continually evaluating the behavior-based factors over time; and updating the digital trust rating based on the posture-based factors at the given time and the behavior-based factors as they change over time. The analyzing behavior-based factors can include evaluating behavior of the client device and/or a user associated with the client device against legitimate and illegitimate actions on the network and with the resources.

The digital trust rating can be for one of (1) the client device and (2) a user on the client device such that the user has a different digital trust rating when using a different client device. The process 200 can include, responsive to the digital trust rating being below a threshold, revoking access to the network and/or the resources by revoking one or more of the certificates associated with the client device.

The analyzing posture-based factors can include scoring the digital trust rating based on whether the client device has previously been seen based on an Internet Protocol (IP) address, a device fingerprint, and a network access technology for the client device. The analyzing posture-based factors can include scoring the digital trust rating based on a rating assigned to a network access technology for the client device. The analyzing posture-based factors can include scoring the digital trust rating based on how a user of the client device is authenticated.

The process 200 can include receiving details of the certificates from a software agent operating on the client device. The rating of certificates associated with the client device can be based on whether the certificates are expired, revoked, or current, a security level of the certificates, and a life left on the certificates.

Processing Device

FIG. 3 is a block diagram of a processing device 300, which may implement any of the devices described herein. The processing device 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the processing device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a Central Processing Unit (CPU), an auxiliary processor among several processors associated with the processing device 300, a semiconductor-based microprocessor (in the form of a microchip or chipset), or generally any device for executing software instructions. When the processing device 300 is in operation, the processor 302 is configured to execute software stored within the memory 310, to communicate data to and from the memory 310, and to generally control operations of the processing device 300 pursuant to the software instructions. The I/O interfaces 304 may be used to receive user input from and/or for providing system output to one or more devices or components.

The network interface 306 may be used to enable the processing device 300 to communicate on a network, such as the Internet. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 308 may incorporate electronic, magnetic, optical, and/or other types of storage media. In one example, the data store 208 may be located internal to the processing device 300, such as, for example, an internal hard drive connected to the local interface 312 in the processing device 300. Additionally, in another embodiment, the data store 308 may be located external to the processing device 300 such as, for example, an external hard drive connected to the I/O interfaces 204 (e.g., SCSI or USB connection). In a further embodiment, the data store 208 may be connected to the processing device 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable Operating System (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Of note, the general architecture of the processing device 300 can define any device described herein. However, the processing device 300 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   monitoring a client device and its access to a network and to resources connected to the network;
   analyzing behavior-based factors and posture-based factors in real-time by continuously combining (1) evaluation of behavior-based factors including illegitimate actions performed by the client device against the network or resources, and (2) posture-based based factors including dynamically scoring certificates associated with the client device based on real-time monitoring of whether the certificated are expired, revoked, or current, a security level of the certificates, and life remaining on the certificates, and dynamically scoring malicious activity patterns associated with a Domain Name System (DNS) server used by the client device, wherein the posture-based factors are continuously updated to reflect real-time changes in certificate state and DNS server malicious activity, and wherein the digital trust rating is continuously updated based on changes to the behavior-based factors and posture-based factors while the client device is accessing the network to determine a digital trust rating at a given time for the client device; and
   providing the digital trust rating at the given time for the client device for use in access permission of the client device to the network and/or to the resources.

2. The method of claim 1, wherein the steps further include:
   evaluating the posture-based factors at the given time and continually evaluating the behavior-based factors over time; and
   updating the digital trust rating based on the posture-based factors at the given time and the behavior-based factors as they change over time, wherein the updating includes dynamically adjusting scores based on real-time changes in the certificate state and DNS server malicious activity.

3. The method of claim 1, wherein the analyzing behavior-based factors includes:
   evaluating behavior of the client device and/or a user associated with the client device against legitimate and illegitimate actions on the network and with the resources, and updating the digital trust rating dynamically based on detected illegitimate actions.

4. The method of claim 1, wherein the digital trust rating is for one of (1) the client device and (2) a user on the client device such that the user has a different digital trust rating when using a different client device.

5. The method of claim 1, wherein the steps further include:
   responsive to the digital trust rating being below a threshold, revoking access to the network and/or the resources by revoking one or more of the certificates associated with the client device, based on real-time evaluation of certificate expiration, revocation, or security level.

6. The method of claim 1, wherein the analyzing posture-based factors includes:

scoring the digital trust rating based on whether the client device has previously been seen based on an Internet Protocol (IP) address, a device fingerprint, and a network access technology for the client device, and dynamically updating the digital trust rating as these attributes change.

7. The method of claim 1, wherein the analyzing posture-based factors includes:
scoring the digital trust rating based on a rating assigned to a network access technology for the client device.

8. The method of claim 1, wherein the analyzing posture-based factors includes:
scoring the digital trust rating based on how a user of the client device is authenticated.

9. The method of claim 1, wherein the steps further include:
receiving details of the certificates from a software agent operating on the client device.

10. The method of claim 1, wherein the rating of certificates associated with the client device is based on
whether the certificates are expired, revoked, or current,
a security level of the certificates, and
a life left on the certificates.

11. A non-transitory computer-readable medium comprising instructions that, when executed, cause one or more processors to perform steps of:
monitoring a client device and its access to a network and to resources connected to the network;
analyzing behavior-based factors and posture-based factors in real-time by continuously combining (1) evaluation of behavior-based factors including illegitimate actions performed by the client device against the network or resources, and (2) posture-based factors including dynamically scoring certificates associated with the client device based on real-time monitoring of whether the certificated are expired, revoked, or current, a security level of the certificates, and life remaining on the certificates, and dynamically scoring malicious activity patterns associated with a Domain Name System (DNS) server used by the client device, wherein the posture-based factors are continuously updated to reflect real-time changes in certificate state and DNS server malicious activity, and wherein the digital trust rating is continuously updated based on changes to the behavior-based factors and posture-based factors while the client device is accessing the network to determine a digital trust rating at a given time for the client device; and
providing the digital trust rating at the given time for the client device for use in access permission of the client device to the network and/or to the resources.

12. The non-transitory computer-readable medium of claim 11, wherein the steps further include:
evaluating the posture-based factors at the given time and continually evaluating the behavior-based factors over time; and
updating the digital trust rating based on the posture-based factors at the given time and the behavior-based factors as they change over time , wherein the updating includes dynamically adjusting scores based on real-time changes in the certificate state and DNS server malicious activity.

13. The non-transitory computer-readable medium of claim 11, wherein the analyzing behavior-based factors includes:
evaluating behavior of the client device and/or a user associated with the client device against legitimate and illegitimate actions on the network and with the resources, and updating the digital trust rating dynamically based on detected illegitimate actions.

14. The non-transitory computer-readable medium of claim 11, wherein the digital trust rating is for one of (1) the client device and (2) a user on the client device such that the user has a different digital trust rating when using a different client device.

15. The non-transitory computer-readable medium of claim 11, wherein the steps further include:
responsive to the digital trust rating being below a threshold, revoking access to the network and/or the resources by revoking one or more of the certificates associated with the client device, based on real-time evaluation of certificate expiration, revocation, or security leve.

16. The non-transitory computer-readable medium of claim 11, wherein the analyzing posture-based factors includes:
scoring the digital trust rating based on whether the client device has previously been seen based on an Internet Protocol (IP) address, a device fingerprint, and a network access technology for the client device, and dynamically updating the digital trust rating as these attributes change.

17. The non-transitory computer-readable medium of claim 11, wherein the analyzing posture-based factors includes:
scoring the digital trust rating based on a rating assigned to a network access technology for the client device.

18. The non-transitory computer-readable medium of claim 11, wherein the analyzing posture-based factors includes:
scoring the digital trust rating based on how a user of the client device is authenticated.

19. The non-transitory computer-readable medium of claim 11, wherein the steps further include:
receiving details of the certificates from a software agent operating on the client device.

20. The non-transitory computer-readable medium of claim 11, wherein the rating of certificates associated with the client device is based on
whether the certificates are expired, revoked, or current,
a security level of the certificates, and
a life left on the certificates.

* * * * *